(12) United States Patent
Hanagata

(10) Patent No.: US 6,580,577 B1
(45) Date of Patent: Jun. 17, 2003

(54) MAGNETIC TAPE APPARATUS WITH FORCED MAGNETIC TAPE CLEANING PROCESS

(75) Inventor: Tadashi Hanagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/441,864

(22) Filed: Nov. 17, 1999

(30) Foreign Application Priority Data

Nov. 18, 1998 (JP) .......................................... 10-328488

(51) Int. Cl.[7] .............................................. G11B 23/50
(52) U.S. Cl. ........................ 360/72.3; 360/74.1; 360/69
(58) Field of Search ........................... 360/72.3, 69, 71, 360/72.1, 72.2, 74.1, 74.2, 74.4, 75, 128, 130.21

(56) References Cited

U.S. PATENT DOCUMENTS 5,347,407 A * 9/1994 Solhjell et al. ......... 360/74.1 X
5,436,774 A * 7/1995 Nakagawara et al. ...... 360/74.4

FOREIGN PATENT DOCUMENTS

| JP | 59-144083 | 8/1984 |
| JP | 2-110013 | 9/1990 |
| JP | 3-25742 A | * 2/1991 |
| JP | 6-12629 | 1/1994 |

OTHER PUBLICATIONS

"Blind Head Scrub Error Recovery Procedure for Magnetic Tape Subsystem," IBM TDB, vol. 35, No. 3, Aug. 1, 1992, pp. 408–409.*

* cited by examiner

Primary Examiner—David Hudspeth
Assistant Examiner—James L Habermehl
(74) Attorney, Agent, or Firm—Foley & Lardner

(57) ABSTRACT

A magnetic tape apparatus prevents dirt from being deposited on a magnetic tape even when the tape is repeatedly moved in a short interval. An operation monitoring unit calculates tape position from information supplied from a tape transport drive circuit and measures tape position from a previously stopped position as a reference point. The operation monitoring unit updates the reference point into a presently stopped position if the tape has moved from the reference point beyond a predetermined range and stopped, accumulates the number of times the tape has been stopped if the tape has moved from the reference point and stopped within the predetermined range, and instructs a control unit to transport the tape in a transported range greater than the predetermined range to bring an area on the tape into contact with a tape cleaner if the accumulated number of times exceeds a predetermined number of times.

9 Claims, 6 Drawing Sheets

MAGNETIC TAPE APPARATUS WITH FORCED MAGNETIC TAPE CLEANING PROCESS

BACKGROUND OF THE INVENTION

1. Field of the Invention

The present invention relates to a magnetic tape apparatus, and more particularly to a magnetic tape apparatus having means for preventing dirt from being accumulated on a magnetic tape.

2. Description of the Related Art

Magnetic tape apparatus transport a magnetic tape to write information on the magnetic tape and read information from the magnetic tape. The magnetic tape produces dirt of magnetic particles when it contacts a magnetic tape transport path and magnetic heads. When the produced dirt is attached to the magnetic tape, it causes a failure to write information on the magnetic tape and read information from the magnetic tape. To prevent such a failure, the magnetic tape apparatus usually have a tape cleaner for scraping the attached dirt off the magnetic tape.

The tape cleaner is usually positioned near a magnetic head. The distance between the tape cleaner and the magnetic tape is often greater than the length of a data block recorded on the magnetic tape. If the magnetic tape is continuously reciprocally moved a distance smaller than the distance between the tape cleaner and the magnetic tape in order to record information and reproduce information from one data block, then an area is developed on the magnetic tape which is held in contact with the magnetic head but kept out of contact with the tape cleaner. As a result, dirt particles are gradually collected in the area, tending to cause a failure to write information on the magnetic tape and read information from the magnetic tape.

SUMMARY OF THE INVENTION

It is therefore an object of the present invention to provide a magnetic tape apparatus which prevents dirt from being accumulated on a magnetic tape even when the magnetic tape is continuously reciprocally moved in a small interval for recording information on and reproducing information from the magnetic tape.

According to the present invention, there is provided a magnetic tape apparatus connected to a computer system, for recording data on and reproducing data from a magnetic tape as instructed by the computer system. The magnetic tape apparatus comprising a magnetic head for recording data on and reproducing data from the magnetic tape, a tape cleaner disposed near the magnetic head for contacting the magnetic tape to clean the magnetic tape, and operation monitoring means;for monitoring movement of the magnetic tape. The operation monitoring means have a function for monitoring reciprocating movement of the magnetic tape in a short interval, and, if the magnetic tape is reciprocally moved at least a predetermined number of times in a predetermined range, for performing a forced cleaning process to cause a drive device for the magnetic tape. The drive device transport the magnetic tape in a transported range greater than the predetermined range to bring an area on the magnetic tape which has been contacted by the magnetic head into contact with the tape cleaner in the forced cleaning process.

The operation monitoring means may comprise means for calculating information of a position of the magnetic tape from information of an operation status and a rotational speed of a reel for transporting the magnetic tape, which information is supplied from a drive circuit for controlling the rotation of the reel, measuring the position of the magnetic tape from a previously stopped position as a reference point, updating the reference point into a presently stopped position if the magnetic tape has moved from the reference point beyond the predetermined range and stopped, refraining to update the reference point and accumulating the number of times that the magnetic tape has been stopped if the magnetic tape has moved from the reference point and stopped within the predetermined range, and instructing a control means for controlling the drive circuit to perform the forced cleaning process if the accumulated number of times exceeds a predetermined number of times.

Alternatively, the operation monitoring means may comprise means for calculating information of a position of the magnetic tape from information of an operation status and a rotational speed of a reel for transporting the magnetic tape, which information is supplied from a drive circuit for controlling the rotation of the reel, measuring the position of the magnetic tape from a previously stopped position as a reference point, updating the reference point into a presently stopped position if the magnetic tape has moved from the reference point beyond the predetermined range and stopped, refraining to update the reference point and accumulating the number of times that the magnetic tape is transported back if the magnetic tape is transported back in the predetermined range, and instructing a control means for controlling the drive circuit to perform the forced cleaning process if the accumulated number of times exceeds a predetermined number of times.

The forced cleaning process may comprise a process of transporting the magnetic tape from a start point for a first distance in a predetermined direction, stopping the magnetic tape, transporting back the magnetic tape from a stopped point for a second distance in excess of the first distance, stopping the magnetic tape, transporting the magnetic tape again in the predetermined direction, and stopping the magnetic tape at the start point.

Alternatively, the forced cleaning process may comprise a process of, while the magnetic tape is being transported in a direction from a process of recording data in and reproducing data from a presently processed data block to a process of recording data in and reproducing data from a next data block, transporting the magnetic tape from an end point of the presently processed data block for a first distance in the same direction as the direction, stopping the magnetic tape, transporting back the magnetic tape from a stopped point for a second distance in excess of the first distance, stopping the magnetic tape, transporting the magnetic tape again in the direction, and stopping the magnetic tape at a start point of the next data block.

The tape cleaner may comprise a single tape cleaner disposed in a position opposite to a reel by which a beginning of the magnetic tape is wound, as viewed from the magnetic head. The predetermined range monitored by the operation monitoring means may extend 2 through 4 times the distance between the magnetic head and the tape cleaner, and the transported range of the magnetic tape in the forced cleaning process may extend 3 through 6 times the distance between the magnetic head and the tape cleaner.

Alternatively, the tape cleaner may comprise two tape cleaners disposed one on each side of the magnetic head. The predetermined range monitored by the operation monitoring means may be substantially the same as the distance between the two tape cleaners, and the transported range of the magnetic tape in the forced cleaning process may extend 1 through 3 times the distance between the two tape cleaners.

With the above arrangement, the magnetic tape apparatus monitors the movement of the magnetic tape in the short interval. If the magnetic tape is repeatedly moved at least a predetermined number of times in the short distance, then the magnetic tape is moved a large distance to bring an area on the magnetic tape which has been repeatedly moved on the magnetic head into the tape cleaner. Therefore, dirt is prevented from being accumulated on the magnetic tape even when the magnetic tape is repeatedly transported back and forth.

The above and other objects, features, and advantages of the present invention will become apparent from the following descriptions based on the accompanying drawings which illustrate examples of preferred embodiments of the present invention.

DETAILED DESCRIPTION OF THE PREFERRED EMBODIMENTS

Figure 1:
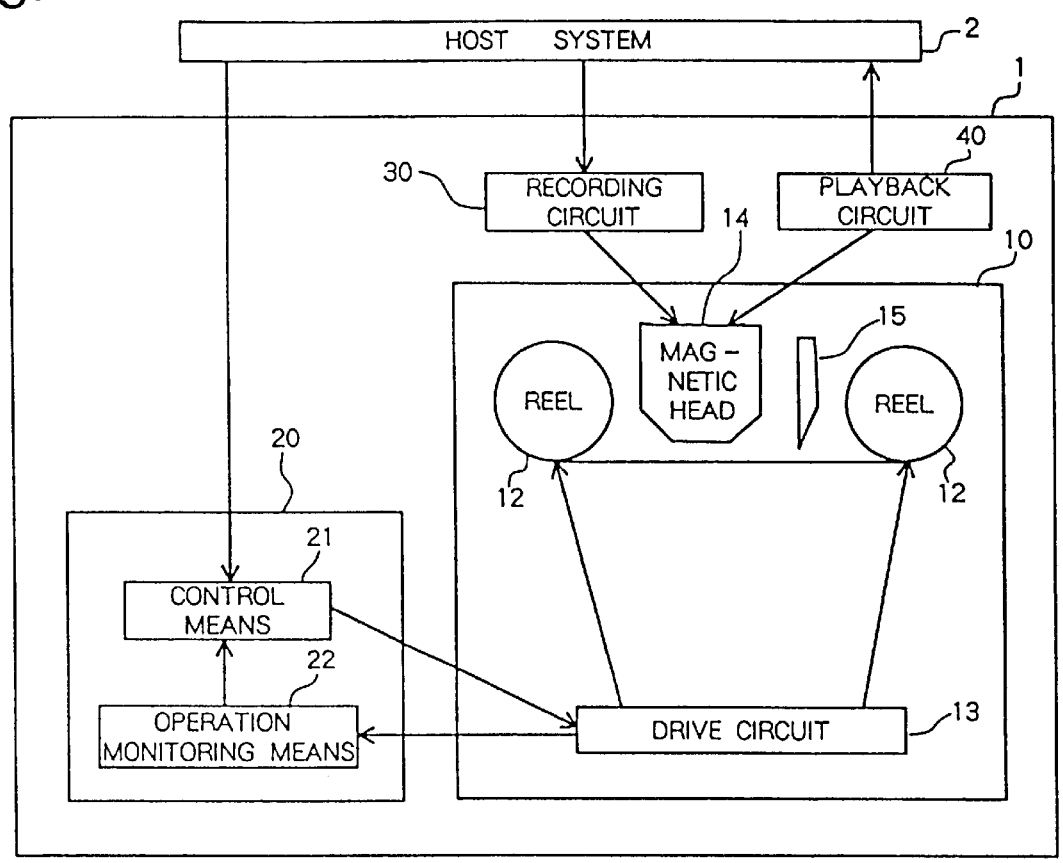
FIG. 1 is a schematic block diagram of a magnetic tape apparatus according to a first embodiment of the present invention.

As shown in FIG. 1, a magnetic tape apparatus 1 according to a first embodiment of the present invention is connected to a host system 2 such as a host computer or the like. The magnetic tape apparatus 1 has a tape drive 10 for transporting a magnetic tape 11 to record information on and reproduce information from the magnetic tape 11, a controller 20 for interpreting instructions from the host system 2 and operating the tape drive 10, a recording circuit 30 for converting data from the host system 2 into a signal to be recorded by the tape drive 10, and a playback circuit 40 for converting a signal reproduced by the tape drive 10 into data to be transferred to the host system 2.

The controller 20 is a programmed controlled control unit, and has a control means 21 for interpreting instructions from the host system 2 and controlling a drive circuit 13, and an operation monitoring means 22 for monitoring operation of the magnetic tape 11.

The tape drive 10 has the magnetic tape 11, two reels 12, the drive circuit 13, a magnetic head 14, and a tape cleaner 15.

The drive circuit 13 rotates the reels 12 to transport the magnetic tape 11 according to a signal supplied from the controller 21. The two reels 12 are rotated by the drive circuit 13. The magnetic tape 11 has its opposite ends wound around the respective reels 12, and is transported when the reels 12 are rotated. The magnetic head 14 is positioned in contact with the magnetic tape 11 between the reels 12, and writes a signal from the recording circuit 30 on the magnetic tape 11 and reads a signal from the magnetic tape 11 and sends the read signal to the playback circuit 40. The tape cleaner 15 is positioned closely to the magnetic head 14 and held in contact with the magnetic tape 11 for scraping dirt of magnetic particles, etc. off the magnetic tape 11.

The operation monitoring means 22 detects the present position of the magnetic tape 11 based on the operating status and rotational speeds of the reels 12 which are supplied from the drive circuit 13. The operation monitoring means 22 stores the position (reference position) of the magnetic tape 11 at the time its monitoring operation is updated, and also the number of times that the magnetic tape 11 has been stopped. Specifically, the position of the magnetic tape 11 is measured on the basis of a previously stopped position as a reference point. When the magnetic tape 11 stops after having moved beyond a predetermined range from the reference point, the operation monitoring means 22 updates the reference point into a presently stopped position. When the magnetic tape 11 stops after having moved within the predetermined range from the reference point, the operation monitoring means 22 does not update the reference point, but integrates the number of times that the magnetic tape 11 has been stopped. If the accumulated number of times that the magnetic tape 11 has been stopped exceeds a predetermined number of times, then the operation monitoring means 22 controls the control means 21 to issues an instruction to transport the magnetic tape 11 for a predetermined distance in a predetermined direction, and to return the magnetic tape 11 to its original position (forced cleaning instruction) for the drive circuit 13.

Operation of the magnetic tape apparatus according to the first embodiment of the present invention will be described below with reference to FIG. 1. For writing data from the host system 2 on the magnetic tape 11, the host system 2 issues a write instruction to the control means 21 and transfers the data to the recording circuit 30. The control means 21 interprets the instruction received from the host system 2, and operates the drive circuit 13 to rotate the reels 12 to move the magnetic tape 11 as instructed. The recording circuit 30 converts the received data into data that can be recorded on the magnetic tape 11, and outputs the data to the magnetic head 14, which writes the data on the magnetic tape 11 which is running in contact with the magnetic head 14. If the magnetic head 14 is present on the side of the reel 12 by which the BOT (beginning of tape) of the magnetic tape 11 is wound as viewed from the tape cleaner 15, then when the data is written on the magnetic tape 11 from the BOT, the magnetic tape 11 first contacts the tape cleaner 15, which scrapes off the dirt attached to the magnetic tape 11, and is then brought into contact with the magnetic head 14, which writes the data from the recording circuit 30 on the magnetic tape 11. Therefore, the data can be written on the magnetic tape 11 stably.

For reading data written on the magnetic tape 11 to the host system 2, the control means 21 interprets the instruction received from the host system 2, and operates the drive circuit 13 to rotate the reels 12 to move the magnetic tape 11 as instructed. As the magnetic tape 11 is transported, the magnetic head 14 plays back data recorded on the magnetic tape 11 via the playback circuit 40, and transfers the data to the host system 2.

If the magnetic head 14 is present on the side of the reel 12 by which the BOT of the magnetic tape 11 is wound as viewed from the tape cleaner 15, then when the data is read from the BOT, the magnetic tape 11 first contacts the tape cleaner 15, which scrapes off the dirt attached to the magnetic tape 11, and is then brought into contact with the magnetic head 14. Therefore, the data can be read from the magnetic tape 11 stably.

Figure 2:
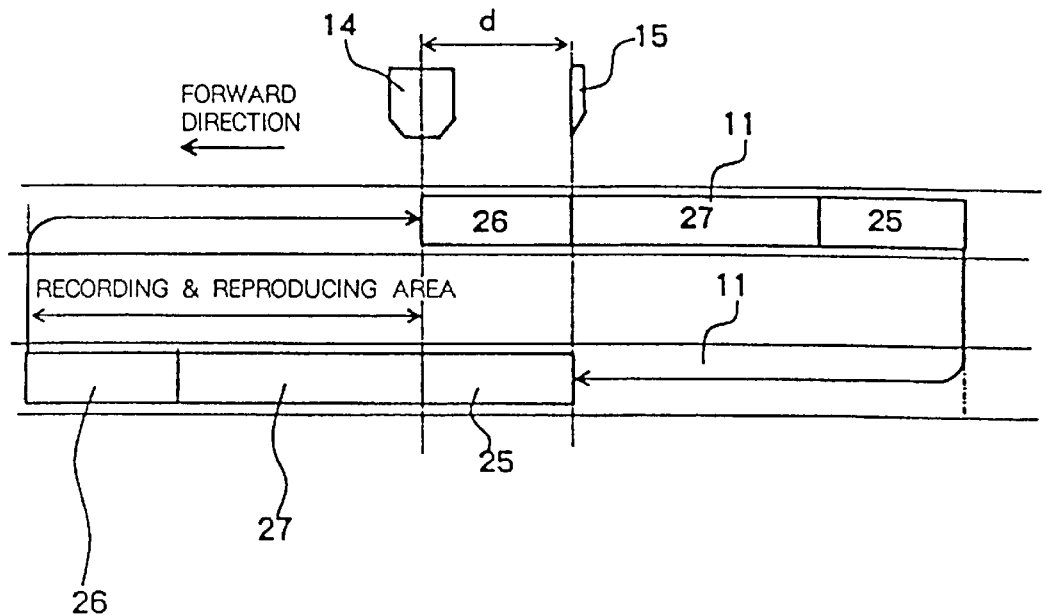
FIG. 2 is a schematic plan view showing the relationship between a magnetic tape, a tape cleaner, and a magnetic head at the time the magnetic tape is reciprocally moved a distance greater than the distance between the magnetic head and the tape cleaner.
Figure 3:
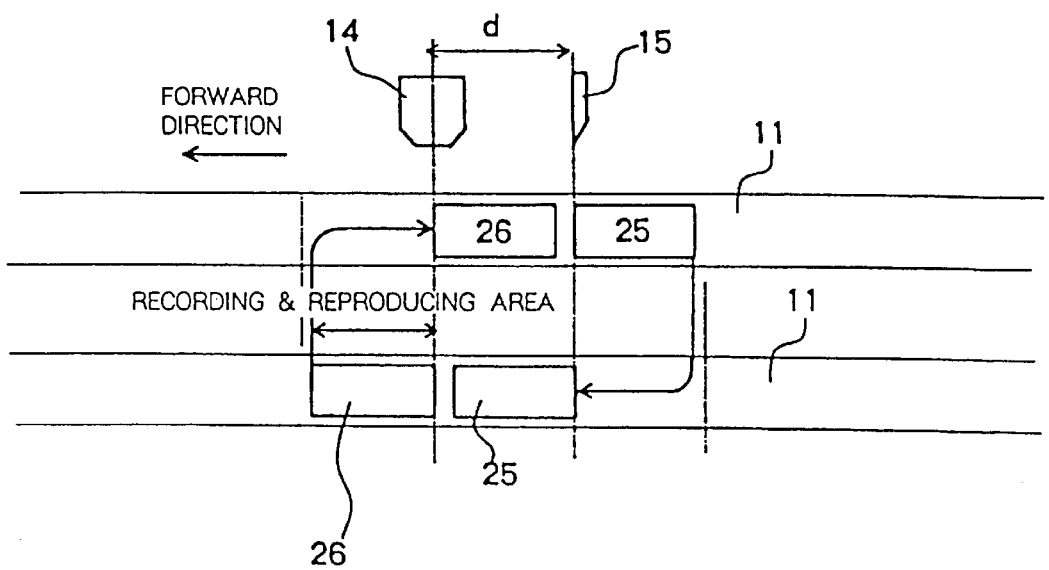
FIG. 3 is a schematic plan view showing the relationship between a magnetic tape, a tape cleaner, and a magnetic head at the time the magnetic tape is reciprocally moved a distance smaller than the distance between the magnetic head and the tape cleaner.

The relationship between the magnetic head 14, the tape cleaner 15, the magnetic tape 11 will be described below with reference to FIGS. 2 and 3. FIG. 2 shows the relationship between the magnetic head 14, the tape cleaner 15, the magnetic tape 11 at the time the magnetic tape 11 is reciprocally moved a distance greater than the distance between the magnetic head 14 and the tape cleaner 15. FIG. 3 shows the relationship between the magnetic head 14, the tape cleaner 15, the magnetic tape 11 at the time the magnetic tape 11 is reciprocally moved a distance smaller than the distance between the magnetic head 14 and the tape cleaner 15.

When the magnetic tape 11 is reciprocally moved a distance greater than the distance d between the magnetic head 14 and the tape cleaner 15, as shown in FIG. 2, three areas are developed on the magnetic tape 11, i.e., an area 25 which contacts only the tape cleaner 15, an area 26 which contacts only the magnetic head 14, and an area 27 which contacts both the tape cleaner 15 and the magnetic head 14. Though dirt appears to be deposited in the area 26 which contacts only the magnetic head 14, the dirt deposited in the area 26 is moved to the area 27 by the magnetic head 14 and contacted by the tape cleaner 15, and hence does not pose a problem.

When the magnetic tape 11 is reciprocally moved a distance smaller than the distance d between the magnetic head 14 and the tape cleaner 15, as shown in FIG. 3, two areas are developed on the magnetic tape 11, i.e., an area 25 which contacts only the tape cleaner 15, and an area 26 which contacts only the magnetic head 14. Since no dirt deposited in the area 26 is moved to the area 27 by the magnetic head 14 and contacted by the tape cleaner 15, unlike the instance shown in FIG. 2, dirt is collected in the area 26 as the magnetic tape 11 is transported. The operation monitoring means 22 monitors whether such a situation arises or not.

Figure 4:
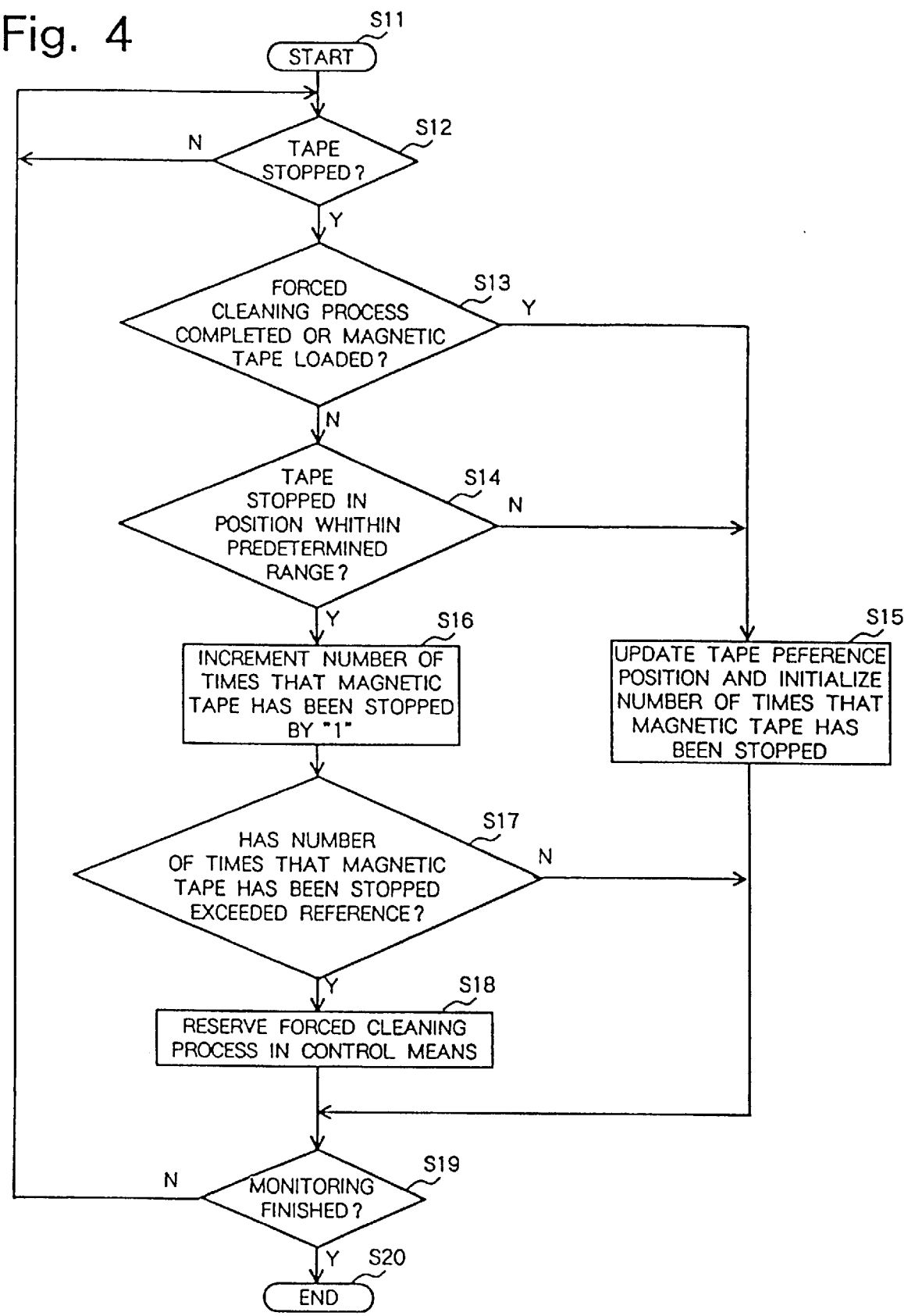
FIG. 4 is a flowchart of a processing sequence of an operation monitoring means according to the first embodiment of the present invention.

A processing sequence of the operation monitoring means 22 will be described below with reference to FIG. 4. When the operation monitoring means 22 starts to operate in step S11, each time the magnetic tape 11 stops in step S12, the operation monitoring means 22 checks the operating status of the magnetic tape 11 before it stops. The operation monitoring means 22 first checks whether or not the magnetic tape 11 stops because a forced cleaning process for cleaning the magnetic tape 11 has been completed or because the magnetic tape 11 has been loaded in step S13.

If the magnetic tape 11 stops because a forced cleaning process has been completed or because the magnetic tape 11 has been loaded (Y in step S13), then the operation monitoring means 22 updates the reference position into the present stopped position of the magnetic tape 11, and initializes the number of times that the magnetic tape 11 has been stopped to "0" in step S15, after which control goes to step S19. If the magnetic tape 11 stops not because a forced cleaning process has been completed or not because the magnetic tape 11 has been loaded (N in step S13), then the operation monitoring means 22 checks whether a transported range of the magnetic tape 11 before it stops is within a predetermined range from the reference position or not in step S14. The predetermined range is set to a distance longer than the distance d between the magnetic head 14 and the tape cleaner 15, and is preferably a value which is one through two times the distance d between the magnetic head 14 and the tape cleaner 15. The predetermined range is stored in the operation monitoring means 22 in advance.

If the transported range of the magnetic tape 11 exceeds the predetermined range from the reference position (N in step S14), then the operation monitoring means 22 updates the reference position into the present stopped position of the magnetic tape 11, and initializes the number of times that the magnetic tape 11 has been stopped to "0" in step S15, after which control goes to step S19.

If the transported range of the magnetic tape 11 falls within the predetermined range from the reference position (Y in step S14), then the operation monitoring means 22 does not update the reference position, and increments the number of times that the magnetic tape 11 has been stopped by "1" in step S16. Then, the operation monitoring means 22 checks the number of times that the magnetic tape 11 has been stopped in step S17. If the number of times that the magnetic tape 11 has been stopped exceeds a predetermined reference (Y in step S17), then the operation monitoring means 22 reserves a process of transporting the magnetic tape 11 a large distance up to a preset range and then returning the magnetic tape 11 back to the present position (forced cleaning process), in the control means 21 in step S18. Thereafter, control proceeds to step S19. If the number of times that the magnetic tape 11 has been stopped does not exceed the predetermined reference (N in step S17), then control jumps to step S19.

In step S19, the operation monitoring means 22 checks if the monitoring process is finished or not. If the monitoring process is not finished (N in step S19), then control returns to step S12 to continue the monitoring process. If the monitoring process is finished, then the processing sequence comes to an end (step S20).

The control means 21 determines whether the forced cleaning process is to be carried out or not when the magnetic tape 11 is stopped. If the forced cleaning process has been reserved and conditions for carrying out the forced cleaning process are satisfied, then, the control means 21 performs the forced cleaning process.

Operation of the operation monitoring means 22 each time the magnetic tape 11 is stopped will be described in detail below.

1) When the magnetic tape 11 is loaded in the magnetic tape apparatus, the BOT of the magnetic tape 11 is detected, and the magnetic tape 11 is stopped:

Since the magnetic tape 11 as it is loaded is stopped (Y in step S13), the operation monitoring means 22 updates the reference position into the present stopped position of the magnetic tape 11, and initializes the number of times that the magnetic tape 11 has been stopped to "0" in step S15.

2) When the magnetic tape 11 as it is loaded is transported beyond the predetermined range, and then stopped:

Since the magnetic tape 11 as it is loaded is transported and stopped (N in step S13), the operation monitoring means 22 checks whether a transported range of the magnetic tape 11 falls within a predetermined range from the reference position or not in step S14. Because the transported range of the magnetic tape 11 exceeds the predetermined range (N in step S14), the operation monitoring means 22 updates the reference position into the present stopped position of the magnetic tape 11, and initializes the number of times that the magnetic tape 11 has been stopped to "0" in step S15.

3) When the magnetic tape 11 as it is loaded is transported within the predetermined range, and then stopped:

Since the magnetic tape 11 as it is loaded is transported and stopped (N in step S13), the operation monitoring means 22 checks whether a transported range of the magnetic tape 11 falls within a predetermined range from the reference position or not in step S14. Because the transported range of the magnetic tape 11 falls within the predetermined range (Y in step S14), the operation monitoring means 22 does not update the reference position, and increments the number of times that the magnetic tape 11 has been stopped by "1" in step S16. If the number of times that the magnetic tape 11 has been stopped does not exceed the predetermined reference (N in step S17), then the operation monitoring means 22 continues the monitoring process (Y in step S19). When the magnetic tape 11 is repeatedly transported and stopped in the predetermined range, the number of times that the magnetic tape 11 has been stopped is incremented until the number of times that the magnetic tape 11 has been stopped exceeds the predetermined reference (Y in step S17). In this case, the operation monitoring means 22 reserves a process of transporting the magnetic tape 11 a large distance up to a preset range and then returning the magnetic tape 11 back to the present position (forced cleaning process), in the control means 21 in step S18.

4) When the forced cleaning process on the magnetic tape 11 is completed, and then the magnetic tape 11 is stopped:

Inasmuch as the forced cleaning process is completed (Y in step S13), the operation monitoring means 22 updates the reference position into the present stopped position of the magnetic tape 11, and initializes the number of times that the magnetic tape 11 has been stopped to "0" in step S15.

The forced cleaning process which the operation monitoring means 22 reserves in the control means 21 will be described below with reference to FIG. 5. It is assumed that either position on the magnetic tape 11 is currently stopped in a present position 31. Based on the reservation, the control means 21 controls the drive circuit 13 to perform the forced cleaning process. A range 39 in which the forced cleaning process is performed has been registered. When instructed by the control means 21 to perform the forced cleaning process, the drive circuit 13 stores the present position 31 of a given position on the magnetic tape 11, and then accelerates the magnetic tape 11 in the same forward direction as the direction in which the magnetic tape 11 has previously been moved. When the magnetic tape 11 is accelerated to a predetermined speed, the drive circuit 13 transports the magnetic tape 11 at the predetermined speed to bring the given position on the magnetic tape 11 to an end of the range 39 of the forced cleaning process. When the given position on the magnetic tape 11 reaches the desired position, the drive circuit 13 decelerates the magnetic tape 11 to a stop (first operation 32). When the magnetic tape 11 stops at a stop point 33, the drive circuit 13 accelerates the magnetic tape 11 in a reverse direction. When the magnetic tape 11 is accelerated to a predetermined speed, the drive circuit 13 transports the magnetic tape 11 at the predetermined speed. When the given position on the magnetic tape 11 reaches an opposite end of the range 39 of the forced cleaning process, the drive circuit 13 decelerates the magnetic tape 11 to a stop (second operation 34). When the magnetic tape 11 stops at a stop point 35, the drive circuit 13 accelerates the magnetic tape 11 in the forward direction. When the magnetic tape 11 is accelerated to a predetermined speed, the drive circuit 13 transports the magnetic tape 11 at the predetermined speed. When the given position on the magnetic tape 11 reaches the position 31 from which the magnetic tape 11 has started moving, the drive circuit 13 transports the magnetic tape 11 for a given distance, and decelerates the magnetic tape 11 to a stop (third operation 36). When the magnetic tape 11 stops at a stop point 37, the drive circuit 13 positions the magnetic tape 11 at the position 31 from which the magnetic tape 11 has started moving. The drive circuit 13 accelerates the magnetic tape 11 in the reverse direction, and thereafter decelerates the magnetic tape 11. The drive circuit 13 returns the given position on the magnetic tape 11 to the position 31 from which the magnetic tape 11 has started moving, whereupon the forced cleaning process is completed (fourth operation 38).

Figure 5:
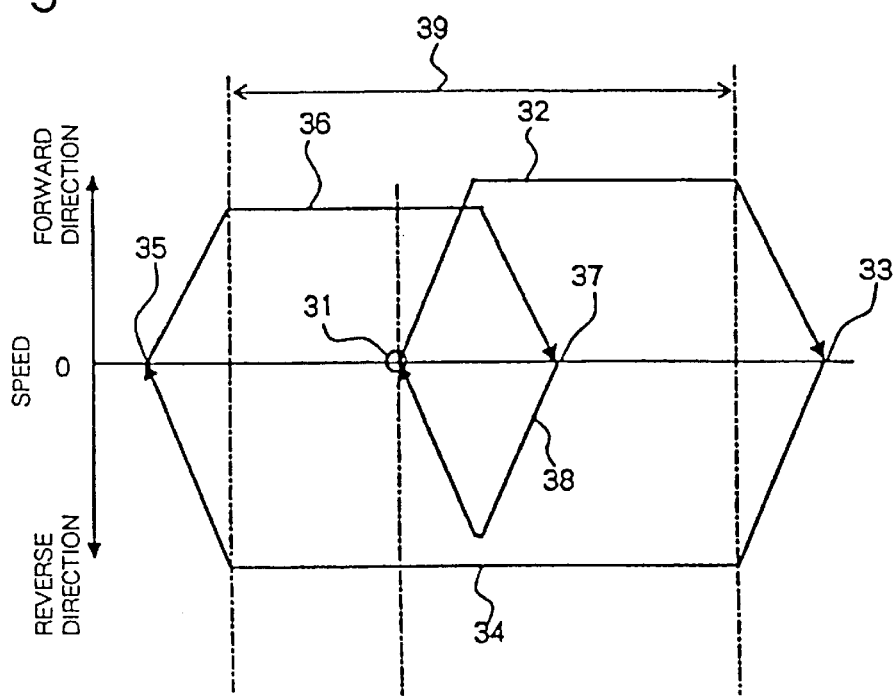
FIG. 5 is a timing chart of a forced cleaning process according to the first embodiment of the present invention.

In FIG. 5, it is assumed that the direction in which the magnetic tape 11 is transported before it is stopped is the forward direction. If the direction in which the magnetic tape 11 is transported before it is stopped is the reverse direction, then the first operation 32 is effected in the reverse direction. At any rate, since the magnetic tape 11 is transported a large distance in the opposite direction in the second operation 34 after the first operation 32 and then returned to the present position, the smeared area of the magnetic tape 11 is held in contact with the tape cleaner 15 regardless of the direction of the first operation 32.

Figure 6:
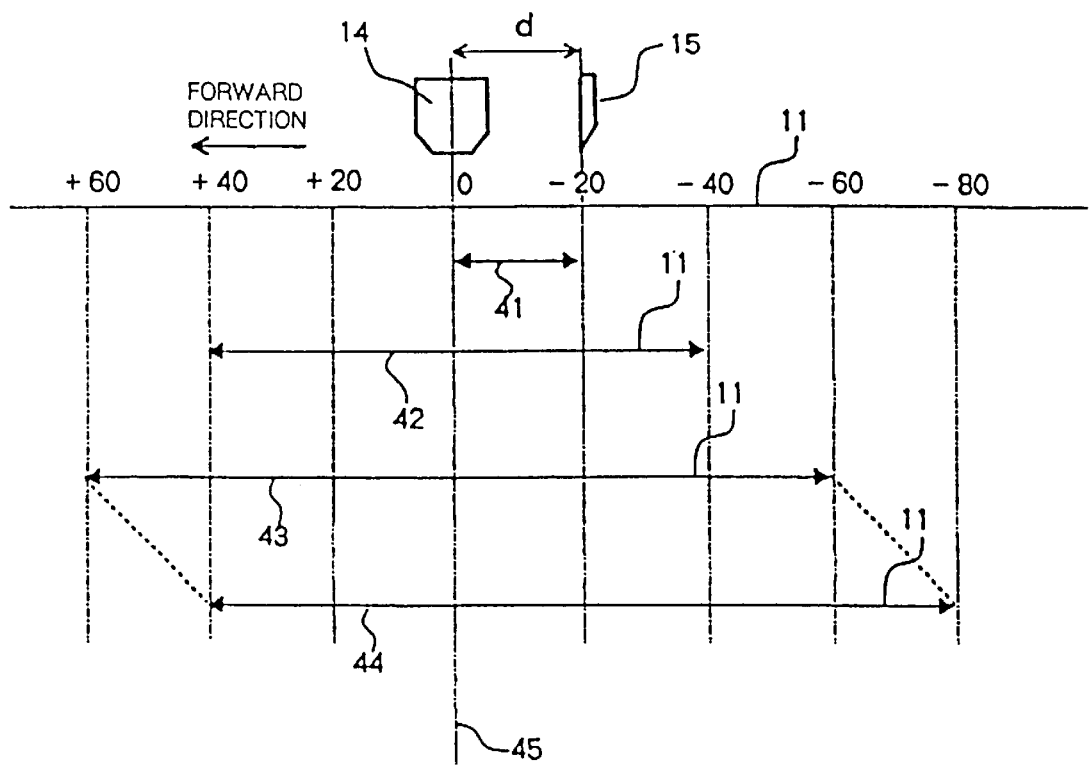
FIG. 6 is a diagram showing a decision reference of the operation monitoring means according to the first embodiment of the present invention.

A decision reference of the operation monitoring means 22 will be described below with reference to FIG. 6.

1) A predetermined range 42 for determining a transported range:

It is assumed that the magnetic head 14 is present on the side of the reel 12 by which the BOT of the magnetic tape 11 is wound as viewed from the tape cleaner 15, and the magnetic head 14 and the tape cleaner 15 are spaced from each other by a distance d 41 of 20 mm. If a reference position 45 lies at the central line of the magnetic head 14 and a predetermined range 42 for determining a transported range of the magnetic tape 11 extends forward and backward of the central line of the magnetic head 14 over respective distances each equal to twice the distance d 41 of 20 mm, then the predetermined range 42 is of 40 mm each forward and backward of the central line of the magnetic head 14. For example, if the present BOT of the magnetic tape 11 is located 1000 mm in the forward direction from the reference position 45, then the present range 42 extends from 960 mm to 1040 mm from the BOT. The operation monitoring means 22 determines whether the position on the magnetic tape 11 which has been at the central line of the magnetic head 14 has been transported beyond this range (from +40 mm to −40 mm) or not.

2) The number of times that the magnetic tape 11 has been stopped in determining whether the forced cleaning process is to be performed or not:

Though the number of times cannot be specified as it is related to the tension of the magnetic tape 11, it is temporarily set to 200.

3) The transported range in the forced cleaning process:

The transported range in the forced cleaning process needs to be greater than the predetermined range 42 which is being monitored. Specifically, the transported range in the forced cleaning process should preferably be 1.5 times to 2 times the predetermined range 42 which is being monitored. If the transported range in the forced cleaning process is 1.5 times the predetermined range 42 which is being monitored, then it is of 60 mm each forward and backward of the central line of the magnetic head 14 (a magnetic tape moving range 43 on which the forced cleaning process is to be performed, based on the magnetic head 14). In order to bring an area of the magnetic tape 11 which has contacted the magnetic head 14 into contact with the tape cleaner 15, it is necessary to move the area of the magnetic tape 11 which has contacted the magnetic head 14 to the position of the tape cleaner 15. The central position on the magnetic tape on which the forced cleaning process is to be performed is displaced by the distance between the magnetic head 14 and the tape cleaner 15. For example, if the present BOT of the magnetic tape 11 is located 1000 mm in the forward direction from the reference position, then the range in which the magnetic tape 11 moves in the forced cleaning process extends from 960 mm to 1080 mm from the BOT (a magnetic tape moving range 44 for bringing the range 43 into contact with the tape cleaner 15). The moving ranges 43, 44 shown in FIG. 6 represent moving ranges of the position on the magnetic tape 11 which has been in the reference point.

Figure 7:
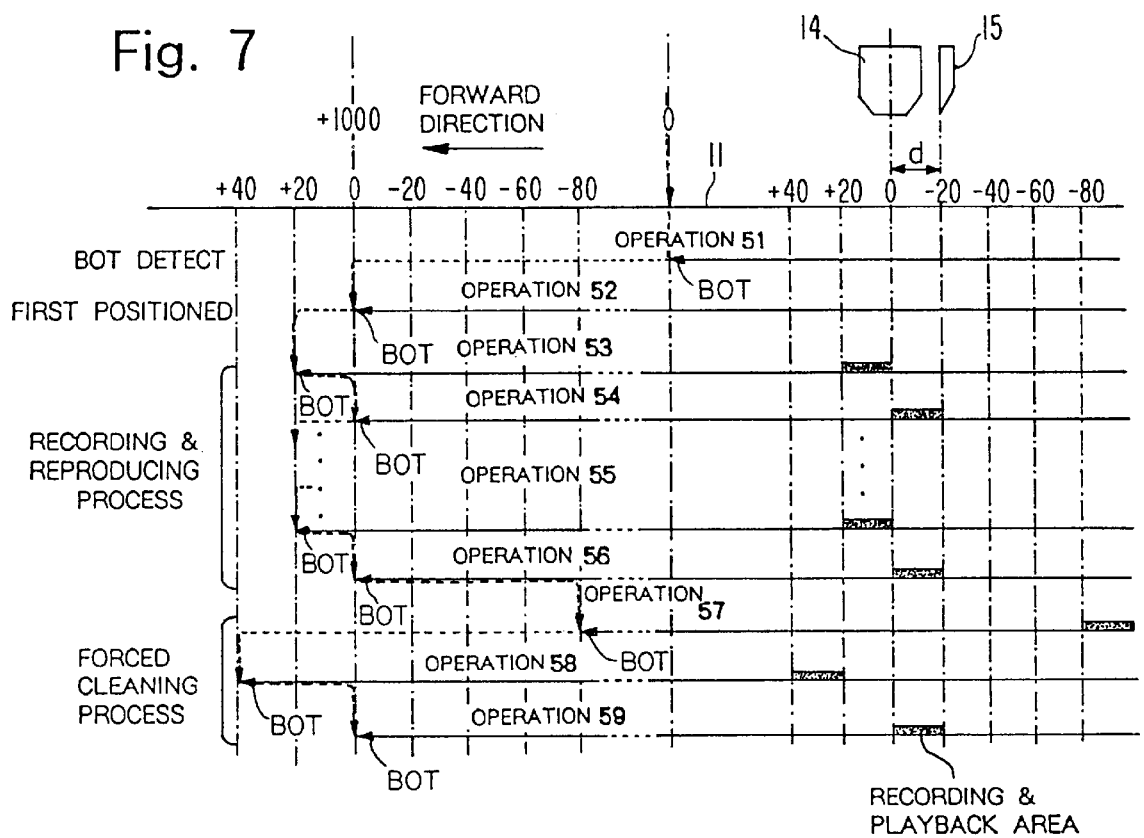
FIG. 7 is a diagram showing operation of the magnetic tape including the forced cleaning process according to the first embodiment of the present invention.

Operation of the magnetic tape 11 and an associated processing process of the operation monitoring means 22 will be described in greater detail with reference to FIG. 4 and FIG. 7 which illustrates operation of the magnetic tape 11 including the forced cleaning process. In FIG. 7, it is assumed that the magnetic head 14 and the tape cleaner 15 are in fixed positions and the transported status of the magnetic tape 11 is indicated by the movement of the arrows representing the BOT position and the movement of the recording and playback area represented by the thick lines.

When the magnetic tape 11 is loaded and the BOT position of the magnetic tape 11 is moved to and stopped at a predetermined BOT detecting position (operation 51), since the magnetic tape 11 is stopped as it is loaded, the operation monitoring means 22 sets the reference position to 0 mm and initializes the number of times that the magnetic tape 11 has been stopped to "0" (Y in step S13, step S15). It is assumed that the BOT is pulled out in the forward direction and the BOT is pulled in in the reverse direction.

When the BOT is transported in the forward direction from the reference position to 1000 mm, positioned, and then stopped (operation 52), since the magnetic tape 11 has been stopped not because the forced cleaning process is completed or not because the magnetic tape 11 is loaded (N in step S13), and the transported distance from the reference position exceeds the predetermined range which is 40 mm each forward and backward (N in step S13 and N in step S14), the operation monitoring means 22 updates the reference position to the position to which the magnetic tape 11 has moved 1000 mm, i.e., to "0", and initializes the number of times that the magnetic tape 11 has been stopped to "0" in step S15.

If the magnetic tape 11 is read 20 mm in the forward direction and then stopped, then the BOT is spaced 1020 mm from the BOT detecting position (operation 53). Since the magnetic tape 11 has been stopped not because the forced cleaning process is completed or not because the magnetic tape 11 is loaded (N in step S13), and the transported distance from the reference position is within the predetermined range which is 40 mm each forward and backward (Y in step S14), the operation monitoring means 22 does not update the reference position, and increments the number of times that the magnetic tape 11 has been stopped from "0" to "1" in step S16. As the reference for the number of times that the magnetic tape 11 has been stopped is not exceeded (N in step S17), the operation monitoring means 22 continues it monitoring process.

If the magnetic tape 11 is read 20 mm in the reverse direction from that position and then stopped, then the magnetic tape 11 returns to the present reference position (operation 54). Since the magnetic tape 11 has been stopped not because the forced cleaning process is completed or not because the magnetic tape 11 is loaded (N in step S13), and the transported distance from the reference position is within the predetermined range which is 40 mm each forward and backward (Y in step S14), the operation monitoring means 22 does not update the reference position, and increments the number of times that the magnetic tape 11 has been stopped from "1" to "2" in step S16. As the reference for the number of times that the magnetic tape 11 has been stopped is not exceeded (N in step S17), the operation monitoring means 22 continues it monitoring process.

When the process of reading the magnetic tape 11 for 20 mm in the forward direction and reading the magnetic tape 11 for 20 mm in the reverse direction is repeated 99 times (operation 55), the magnetic tape 11 returns to the reference position and is stopped (operation 55). Inasmuch as the magnetic tape 11 has been stopped not because the forced cleaning process is completed or not because the magnetic tape 11 is loaded (N in step S13), and the transported distance from the reference position is within the predetermined range which is 40 mm each forward and backward (Y in step S14), the operation monitoring means 22 does not update the reference position, and increments the number of times that the magnetic tape 11 has been stopped from "199" to "200" in step S16. As the number of times that the magnetic tape 11 has been stopped reaches the reference 200 (Y in step S17), the operation monitoring means 22 reserves the forced cleaning process in the control means 21.

The forced cleaning process is a process of transporting the magnetic tape 11 in a range from the reference position −80 mm to the reference position +40 mm and then returning the magnetic tape 11 to the reference position which is the original position. Because the startup time for the magnetic tape 11 needs to be reduced and the magnetic tape 11 needs to be returned to the same position as the position at the start of operation when the operation is completed, the magnetic tape 11 is first transported in the same direction as the direction in which the magnetic tape 11 has finally been transported (operation 57). Since the magnetic tape 11 has been transported in the reverse direction and then stopped, the magnetic tape 11 is first transported 80 mm in the reverse direction. Then, in order to move the magnetic tape 11 to the position of the reference point +40 mm, the magnetic tape 11 is transported 120 mm in the forward direction (operation 58). Finally, in order to return the magnetic tape 11 to the original position, the magnetic tape 11 is transported 40 mm in the reverse direction (operation 59), whereupon the forced cleaning process is completed. In FIG. 7, it is assumed that the magnetic tape 11 has been transported in the reverse direction and then stopped. However, if the magnetic tape 11 has been transported in the forward direction and then stopped, then the forced cleaning process is performed in the opposite direction. Since the magnetic tape 11 is first transported a large distance in the forward direction and thereafter transported in the opposite direction for a distance greater than the large distance, after which the magnetic tape 11 is returned, the recording and playback area represented by the thick lines in FIG. 7 is brought into contact with the tape cleaner 15.

The magnetic tape 11 is reciprocally moved between 0 and +20 and stopped at both ends. However, depending on the contents of the recording or playback process, the magnetic tape 11 may be stopped in an intermediately position and transported again in the same direction, or may be stopped in an intermediately position and transported backward.

Though the stopping of the magnetic tape 11 in the forced cleaning process is to be monitored, the operation monitoring means 22 does not monitor the stopping of the magnetic tape 11 in the forced cleaning process and does not update the reference position. When the forced cleaning process is completed (Y in step S13), the operation monitoring means 22 updates the reference position to the present position of the magnetic tape 11, i.e., to "0", and initializes the number of times that the magnetic tape 11 has been stopped to "0" in step S15.

A magnetic tape apparatus according to a second embodiment of the present invention will be described below. The magnetic tape apparatus according to the second embodiment differs from the magnetic tape apparatus according to the first embodiment in that tape cleaners 15 are disposed one on each side of the magnetic head 14. Other structural details of the magnetic tape apparatus according to the second embodiment are identical to those of the magnetic tape apparatus according to the first embodiment, and will not be described in detail below. Only different details of the magnetic tape apparatus according to the second embodiment will be described below using the reference characters shown in FIG. 1.

Figure 8:
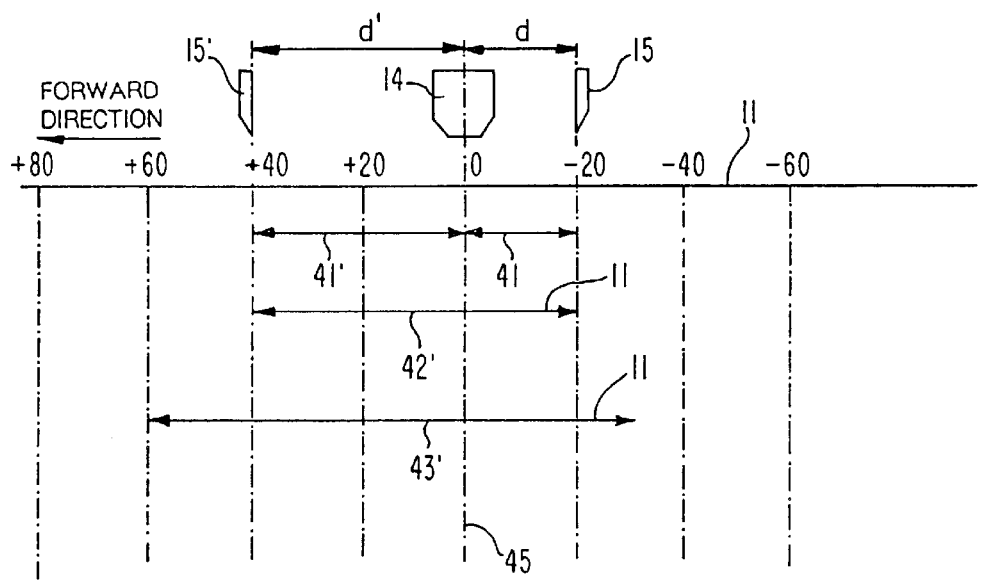
FIG. 8 is a diagram showing a decision reference of an operation monitoring means according to a second embodiment of the present invention.

FIG. 8 shows a decision reference of an operation monitoring means according to the second embodiment of the present invention. Two tape cleaners 15, 15' are spaced from the magnetic head 14 by distances 41, 41' which may be equal to or not equal to each other. A predetermined range 42' to be monitored is equal to or longer than a distance d+d' between the two tape cleaners 15, 15'. It is assumed that the predetermined range 42' is equal to the distance between the two tape cleaners 15, 15'. As with the first embodiment, even if the range in which the forced cleaning process is performed is 1.5 times the predetermined range 42', since the predetermined range 42' is shorter, the range 43' in which the forced cleaning process is performed is shorter than the range in which the forced cleaning process is performed according to the first embodiment. Because the tape cleaners 15 are disposed one on each side of the magnetic head 14, it is not necessary to displace the range in which the forced cleaning process is performed in order to bring the tape cleaners into contact with the desired area on the magnetic tape 11.

A magnetic tape apparatus according to a third embodiment of the present invention will be described below. In the first embodiment, when the magnetic tape is stopped, the status is monitored and the forced cleaning process is carried out. If the forced cleaning process has been reserved when the recording or reproducing process is finished in one data block and the magnetic tape 11 is stopped, then the forced cleaning process is performed. According to the third embodiment, it is determined whether the forced cleaning process is to be carried out or not before recording or reproducing process is finished in one data block and the magnetic tape 11 is stopped. The magnetic tape apparatus according to the third embodiment is structurally identical to the magnetic tape apparatus according to the first embodiment, the magnetic tape apparatus according to the third embodiment will be described below using the reference characters shown in FIG. 1.

Figure 9:
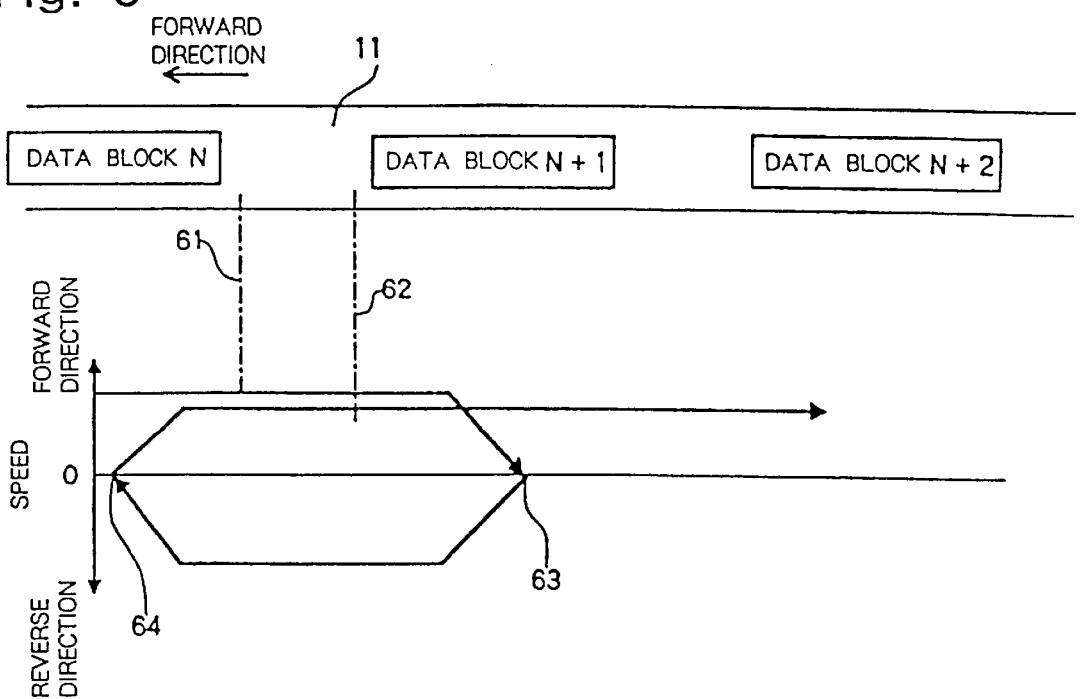
FIG. 9 is a diagram showing detailed operation of a magnetic tape at the end of a recording and reproducing process in data blocks according to a third embodiment of the present invention.

Operation of the magnetic tape apparatus according to the third embodiment will be described below with reference to FIG. 9 which shows detailed operation of the magnetic tape at the end of a recording and reproducing process in data blocks and FIG. 10 which shows a processing sequence for ending the recording and reproducing process in data blocks.

Usually, after the reading of a data block N recorded on the magnetic tape 11 is completed, the control means 21 determines whether a data block N+1 is to be read or not between a position 61 where a block completion report for the data block N is given and a position 62 where the block N+1 starts. If the data block N+1 is to be read, then the magnetic tape 11 is transported at the present speed. If the data block N+1 is not to be read and the magnetic tape 11 is to be stopped, the control means 21 reserves a tape stopping process in the drive circuit 13. The drive circuit 13 then transports the magnetic tape 11 for a while, decelerates the magnetic tape 11, and stops the magnetic tape 11 at a stop point 63. Then, the drive circuit 13 returns the magnetic tape 11 to a stop point 64 so that the data block N+1 can immediately be read. Specifically, the drive circuit 13 accelerates the magnetic tape 11 in the reverse direction from the stop point 63, transports the magnetic tape 11 at a constant speed for a while, decelerates the magnetic tape 11, and returns the magnetic tape 11 to the stop point 64, whereupon the tape stopping process is finished. From the stop point 64, the magnetic tape 11 can be accelerated in the forward direction from the stopped state, achieves a constant speed where the magnetic tape 11 can be read, and can pass through the position 62 where the data block N+1 starts. If the forced cleaning process has been reversed up to this time, then the forced cleaning process is performed after the magnetic tape 11 has been stopped at the stop point 64.

Figure 10:
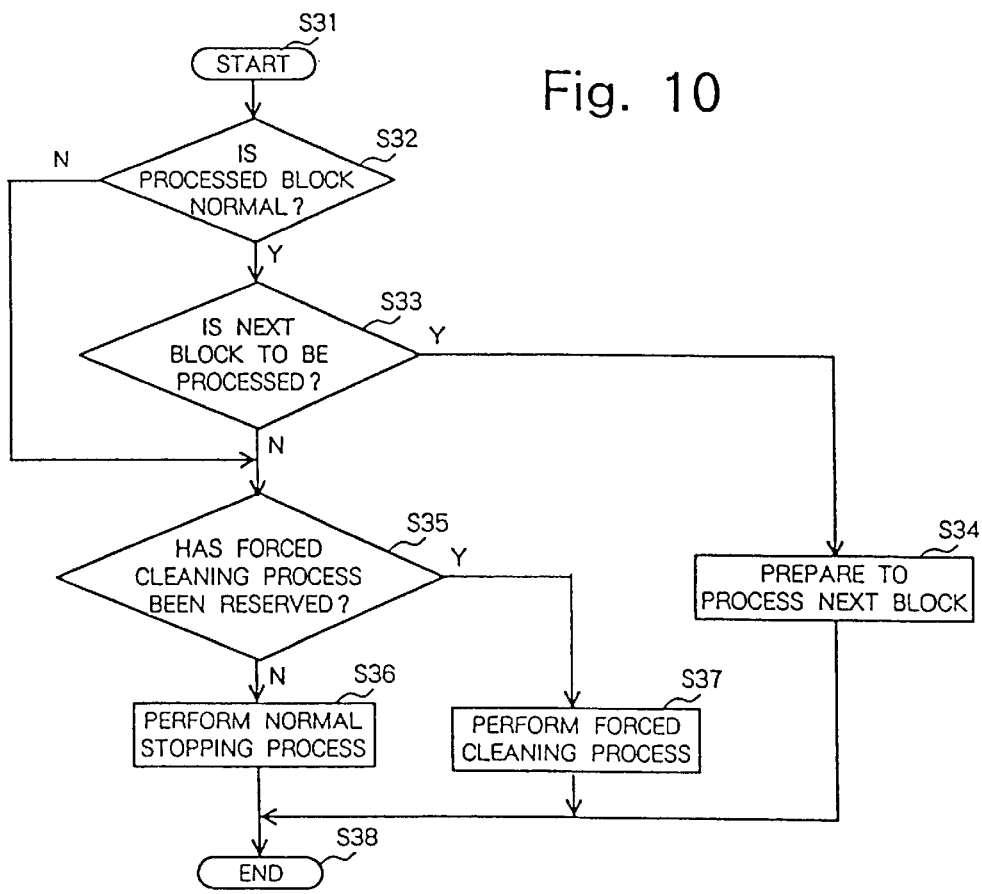
FIG. 10 is a flowchart of a processing sequence for ending the recording and reproducing process in data blocks according to the third embodiment of the present invention.

FIG. 10 shows a decision process for determining a next data block is to be read or not, from the position 61 where the block completion report for the preceding data block is given to the position 62 where the next data block starts. When the decision process is started in step S31, it is determined whether the processed data block N is normal or not in step S32. If the processed data block N is not normal (N in step S32), then a data block N+1 is not read, and control goes to step S35. If the processed data block N is normal (Y in step S32), then it is determined whether the data block N+1 is to be processed or not in step S33. If the data block N+1 is to be processed (Y in step S33), then a preparatory process for processing the data block N+1 is carried out in step S34. Then, the decision process is finished, and the magnetic tape 11 is transported at the present speed in step S38. If the data block N+1 is not to be processed (N in step S33), then, whereas the normal stopping process would be reserved in step S36 and the process of ending the data blocks would be completed according to the other embodiments, it is determined prior to step S36 whether the forced cleaning process has been reserved or not in step S35 according to the third embodiment. The decision as to whether the forced cleaning process has been reserved or not is carried out in the same manner as with the first embodiment shown in FIG. 4. If the forced cleaning process has been reserved (Y in step S35), then the forced cleaning process is performed in step S37, and the decision process is finished in step S38. The forced cleaning process is the same as the forced cleaning process shown in FIG. 5. However, since the reserved forced cleaning process is performed while the magnetic tape is being transported, the startup process from the stopped state in the first operation shown in FIG. 5 is not required. If the forced cleaning process has not been reserved (N in step S35), then the normal stopping process is reserved in step S36, and the decision process is finished in step S38.

In the first embodiment, the state is monitored when the magnetic tape is stopped, and when the recording or reproducing is finished in one data block and the magnetic tape is stopped, if the forced cleaning process has reserved, then the forced cleaning process is performed. According to the third embodiment, a reservation of the forced cleaning process is checked before the recording or reproducing is finished in one data block and the magnetic tape is stopped. If the forced cleaning process has been reserved, then the magnetic tape is transported and the forced cleaning process is performed, after which the magnetic tape is returned to a position where it is to be stopped. Since the number of times that the magnetic tape is to be stopped according to the third embodiment is one time smaller than the number of times that the magnetic tape is to be stopped according to the first embodiment, the time required to stop and start the magnetic tape can be shortened. In an apparatus wherein a time (a time for repositioning operation) which is the sum of the time required to stop the magnetic tape from the running state at a position where a next data block can immediately be read and the time required to transport the magnetic tape from the stopped state is 125 ms., then the time of 125 ms. can be reduced.

A fourth embodiment of the present invention will be described below. In the first embodiment, the number of times that the magnetic tape has been stopped is used as a reference to determine whether the forced cleaning process is to be performed or not. According to the fourth embodiment, the number of times of changing direction in which the magnetic tape is transported is used as a reference to determine whether the forced cleaning process is to be performed or not. Since the transportation of the magnetic tape shortly several times in one direction is counted as one transportation, the number of times used as a reference to determine whether the forced cleaning process is to be performed or not may be of a value smaller than the number of times used in the first embodiment. While the magnetic tape is being transported in one direction, since the magnetic tape does not contact one region again, even if the magnetic tape is stopped, any accumulation of dirt on the magnetic tape is small, and hence such stopping of the magnetic tape is not counted.

The present invention offers an advantage in that even when the magnetic tape apparatus repeats the reading of data from and the writing of data in a local area on the magnetic tape, the magnetic tape apparatus is less liable to suffer a failure due to the reading of data from and the writing of data in such a local area on the magnetic tape.

The reasons for the above advantage are that the range in which and the number of times that the magnetic tape moves are monitored, and when the reading of data from and the writing of data in a local area on the magnetic tape are repeated, the magnetic tape is automatically transported a large distance to bring an area on the magnetic tape where the data is recorded and reproduced into contact with the tape cleaner for thereby preventing dirt from being collected in the local area.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A magnetic tape apparatus connected to a computer system, for recording data on and reproducing data from a magnetic tape as instructed by the computer system, comprising:

a magnetic head for recording data on and reproducing data from the magnetic tape;

a tape cleaner disposed near the magnetic head for contacting the magnetic tape to clean the magnetic tape; and operation monitoring means for monitoring reciprocating movement of the magnetic tape in a short interval, and, if the magnetic tape is reciprocally moved at least a predetermined number of times in a predetermined range, for performing a forced cleaning process to cause a drive device for the magnetic tape to transport the magnetic tape in a transported range greater than said predetermined range to bring an area on the magnetic tape which has been contacted by said magnetic head into contact with said tape cleaner.

2. A magnetic tape apparatus according to claim 1, wherein said operation monitoring means comprises means for calculating information of a position of said magnetic tape from information of an operation status and a rotational speed of a reel for transporting the magnetic tape, which information is supplied from a drive circuit for controlling the rotation of said reel, measuring the position of said magnetic tape from a previously stopped position as a reference point, updating the reference point into a presently stopped position if said magnetic tape has moved from the reference point beyond the predetermined range and stopped, refraining to update the reference point and accumulating the number of times that the magnetic tape has been stopped if said magnetic tape has moved from the reference point and stopped within the predetermined range, and instructing a control means for controlling said drive circuit to perform said forced cleaning process if the accumulated number of times exceeds a predetermined number of times.

3. A magnetic tape apparatus according to claim 1, wherein said operation monitoring means comprises means for calculating information of a position of said magnetic tape from information of an operation status and a rotational speed of a reel for transporting the magnetic tape, which information is supplied from a drive circuit for controlling the rotation of said reel, measuring the position of said magnetic tape from a previously stopped position as a reference point, updating the reference point into a presently stopped position if said magnetic tape has moved from the reference point beyond the predetermined range and stopped, refraining to update the reference point and accumulating the number of times that the magnetic tape is transported back if the magnetic tape is transported back in said predetermined range, and instructing a control means for controlling said drive circuit to perform said forced cleaning process if the accumulated number of times exceeds a predetermined number of times.

4. A magnetic tape apparatus according to claim 1, wherein said forced cleaning process comprises a process of transporting the magnetic tape from a start point for a first distance in a predetermined direction, stopping the magnetic tape, transporting back the magnetic tape from a stopped point for a second distance in excess of said first distance, stopping the magnetic tape, transporting the magnetic tape again in said predetermined direction, and stopping the magnetic tape at said start point.

5. A magnetic tape apparatus according to claim 1, wherein said forced cleaning process comprises a process of, while the magnetic tape is being transported in a direction from a process of recording data in and reproducing data from a presently processed data block to a process of recording data in and reproducing data from a next data block, transporting the magnetic tape from an end point of the presently processed data block for a first distance in the same direction as said direction, stopping the magnetic tape, transporting back the magnetic tape from a stopped point for a second distance in excess of said first distance, stopping the magnetic tape, transporting the magnetic tape again in said direction, and stopping the magnetic tape at a start point of said next data block.

6. A magnetic tape apparatus according to claim 1, wherein said tape cleaner comprises a single tape cleaner disposed in a position opposite to a reel by which a beginning of said magnetic tape is wound, as viewed from said magnetic head.

7. A magnetic tape apparatus according to claim 6, wherein said predetermined range monitored by said operation monitoring means extends 2 through 4 times the distance between said magnetic head and said tape cleaner, and the transported range of said magnetic tape in said forced cleaning process extends 3 through 6 times the distance between said magnetic head and said tape cleaner.

8. A magnetic tape apparatus according to claim 1, wherein said tape cleaner comprises two tape cleaners disposed one on each side of said magnetic head.

9. A magnetic tape apparatus according to claim 8, wherein said predetermined range monitored by said operation monitoring means is substantially the same as the distance between said two tape cleaners, and the transported range of said magnetic tape in said forced cleaning process extends 1 through 3 times the distance between said two tape cleaners.

* * * * *